US010185765B2

(12) United States Patent
Kato et al.

(10) Patent No.: US 10,185,765 B2
(45) Date of Patent: Jan. 22, 2019

(54) NON-TRANSITORY COMPUTER-READABLE MEDIUM, INFORMATION CLASSIFICATION METHOD, AND INFORMATION PROCESSING APPARATUS

(71) Applicant: FUJI XEROX CO., LTD., Tokyo (JP)

(72) Inventors: Noriji Kato, Yokohama (JP); Tomoko Okuma, Yokohama (JP); Motofumi Fukui, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 563 days.

(21) Appl. No.: 13/753,032

(22) Filed: Jan. 29, 2013

(65) Prior Publication Data

US 2014/0067809 A1 Mar. 6, 2014

(30) Foreign Application Priority Data

Sep. 6, 2012 (JP) .................................. 2012-196417

(51) Int. Cl.
*G06F 17/30* (2006.01)
(52) U.S. Cl.
CPC .... *G06F 17/30705* (2013.01); *G06F 17/3061* (2013.01); *G06F 17/30265* (2013.01)
(58) Field of Classification Search
CPC ........... G06F 17/30265; G06F 17/3061; G06F 17/30705; G06F 17/30867;
(Continued)

(56) References Cited

U.S. PATENT DOCUMENTS

2005/0271352 A1* 12/2005 Yokouchi ............. G11B 27/329
386/224
2008/0201222 A1* 8/2008 Lahaix ................... G06Q 30/02
705/14.44
(Continued)

FOREIGN PATENT DOCUMENTS

KR 101088787 B1 * 12/2011 ............. G06Q 50/00
WO WO 2010/123264 A2 10/2010
(Continued)

OTHER PUBLICATIONS

Zheng et al. A Framework for Authorship Identification of Online Messages: Writing-Style Features and Classification Techniques, Journal of the American society for information science and technology, Feb. 2006 (Year: 2006).*

(Continued)

*Primary Examiner* — Augustine K. Obisesan
(74) *Attorney, Agent, or Firm* — Oliff PLC

(57) ABSTRACT

There is provided a non-transitory computer-readable medium storing a program causing a computer to execute a process. The process includes: accepting a search keyword; retrieving, from information items posted by users, a posted information item including the accepted search keyword, each of the posted information items including at least either of a text information item and an image information item, and acquiring posted information items which are within a predetermined chronological range with respect to the posted information item including the search keyword; and classifying, as image information items related to the search keyword, some of image information items included in the posted information items that have been acquired, and performing first determination of, for each of the classified image information items, whether or not a user who posted (Continued)

an information item including the classified image information item took an action related to the search keyword.

14 Claims, 12 Drawing Sheets

(58) Field of Classification Search
CPC .......... G06F 17/30268; G06F 17/3028; G06F 17/30864; G06F 17/30244; G06F 17/30253; G06F 17/2785; G06F 17/30241; G06F 17/30247; G06C 50/01; G06C 30/0269; G06C 30/0277; G06K 9/4671; G06K 9/00744; G06K 9/00147; G06Q 50/01; G06Q 30/0269; G06Q 30/0277

See application file for complete search history.

(56) References Cited

U.S. PATENT DOCUMENTS

| | | | | |
|---|---|---|---|---|
| 2009/0116736 A1* | 5/2009 | Neogi | ................ | G06K 9/6885 382/159 |
| 2010/0042910 A1* | 2/2010 | Manolescu | ........... | G06F 17/241 715/202 |
| 2010/0211868 A1* | 8/2010 | Karmarkar et al. | .......... | 715/234 |
| 2011/0246562 A1* | 10/2011 | Kang | ............................ | 709/203 |
| 2012/0005203 A1* | 1/2012 | Brzozowski et al. | ........ | 707/732 |
| 2012/0117475 A1 | 5/2012 | Lee et al. | | |
| 2012/0148118 A1* | 6/2012 | Lee | .................... | G06K 9/00362 382/118 |
| 2012/0278253 A1* | 11/2012 | Gahlot et al. | ................. | 705/347 |
| 2013/0018968 A1* | 1/2013 | Pennacchiotti | ........ | G06Q 10/10 709/206 |
| 2013/0041898 A1* | 2/2013 | Ishida | .......................... | 707/736 |
| 2013/0054553 A1* | 2/2013 | Yoon | ................ | G06F 17/30716 707/706 |
| 2013/0103385 A1* | 4/2013 | Ghosh et al. | ..................... | 704/9 |
| 2013/0124191 A1* | 5/2013 | Louis et al. | ..................... | 704/9 |
| 2013/0159277 A1* | 6/2013 | Liu et al. | ...................... | 707/709 |
| 2014/0019615 A1* | 1/2014 | Jennings | ...................... | 709/224 |

FOREIGN PATENT DOCUMENTS

| | | | | |
|---|---|---|---|---|
| WO | WO 2010139091 A1 * | 12/2010 | ....... | G06F 17/30265 |
| WO | WO 2012006682 A1 * | 1/2012 | ............. | H04L 51/12 |

OTHER PUBLICATIONS

Inui et al, "Experience Mining: Extraction and Classification of Experiences of Individual Persons from Web Documents," *Proceedings of the fourteenth annual meeting of the Association for Natural Language Processing*, 2008, pp. 1077-1080. (with translation).

Mar. 13, 2014 Office Action issued in Australian Patent Application No. 2013201006.

* cited by examiner

FIG. 3

| USER ID | MICROBLOG ID | CONTENT |
|---|---|---|
| 1 | 101 | I have just now watched the Nagara River Fireworks Display! s as I thought, the finale was fantastic w http://ABCXYZ.com/image1.jpg |
| 3 | 301 | I want to attend it someday. But, when I think about long lines & very heavy congestion on the way home ···(^_^;), it seems difficult to attend it with kids. |
| 2 | 201 | How about wearing yukata and visiting Meiji Mura? But the number of fireworks is only 500 www http://ABCXYZ.com/image2.jpg |
| 1 | 102 | The fireworks at the Nagara River were beautiful. But the viewing areas were crowded ··· to death ··· well, to death!! |
| 4 | 401 | Trash left after the fireworks display is a serious issue. I don't think I will attend it w |
| 4 | 402 | I really want to watch the fireworks at the Nagara River. But I don't have the guts to attend it because the viewing areas are densely crowded. |
| 5 | 501 | I'm excited about the fireworks! http://ABCXYZ.com/image3.jpg |

FIG. 4
| USER ID | MICROBLOG ID | IMAGE CONTENT |
|---|---|---|
| 1 | 101 | 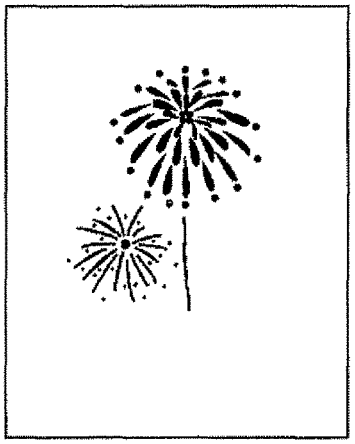 |
| 2 | 201 | 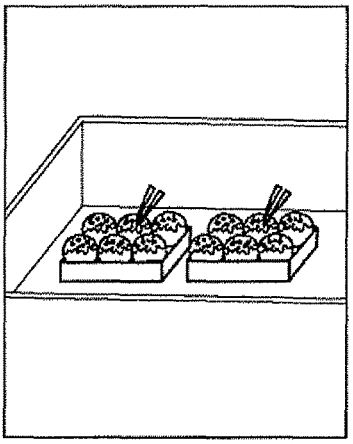 |
| 5 | 501 | 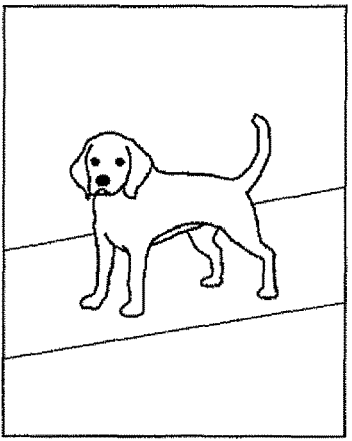 |

FIG. 5

| USER ID | MICROBLOG ID | CONTENT |
|---|---|---|
| 1 | 101 | I have just now watched the Nagara River Fireworks Display! s as I thought, the finale was fantastic w |
| 1 | 102 | The fireworks at the Nagara River were beautiful. But the viewing areas were crowded ··· to death ··· well, to death!! |
| 2 | 201 | How about wearing yukata and visiting Meiji Mura? But the number of fireworks is only 500 wwww |
| 3 | 301 | I want to attend it someday. But, when I think about long lines & very heavy congestion on the way home ···(^_^;), it seems difficult to attend it with kids. |
| 4 | 401 | Trash left after the fireworks display is a serious issue. I don't think I will attend it w |
| 4 | 402 | I really want to watch the fireworks at the Nagara River. But I don't have the guts to attend it because the viewing areas are densely crowded. |
| 5 | 501 | I'm excited about the fireworks! |

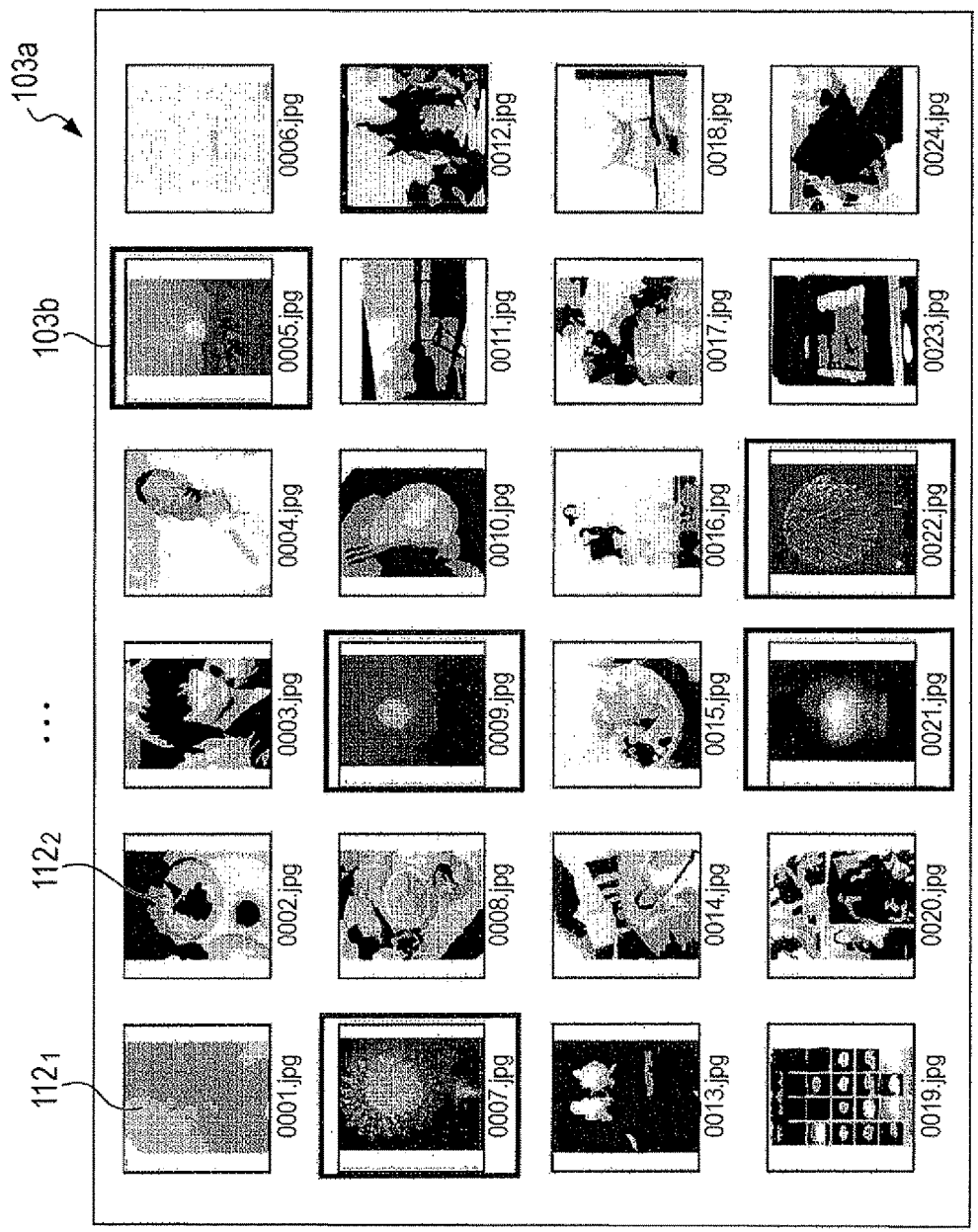

FIG. 7

| USER ID | MICROBLOG ID | CONTENT | IMAGE CONTENT | ACTION TAKEN/NOT-TAKEN DETERMINATION RESULT | POSITIVE/NEGATIVE DETERMINATION RESULT |
|---|---|---|---|---|---|
| 1 | 101 | I have just now watched the Nagara River Fireworks Display! s as I thought, the finale was fantastic w | 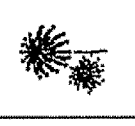 | ATTENDED | POSITIVE |
| 1 | 102 | The fireworks at the Nagara River were beautiful. But the viewing areas were crowded … to death … well, to death!! | NO IMAGE | | NEGATIVE |
| 2 | 201 | How about wearing yukata and visiting Meiji Mura? But the number of fireworks is only 500 wwww |  | ATTENDED | NOT EITHER |
| 3 | 301 | I want to attend it someday. But, when I think about long lines & very heavy congestion on the way home … (^_^;), it seems difficult to attend it with kids. | NO IMAGE | NOT ATTENDED | POSITIVE |
| 4 | 401 | Trash left after the fireworks display is a serious issue. I don't think I will attend it w | NO IMAGE | | NEGATIVE |
| 4 | 402 | I really want to watch the fireworks at the Nagara River. But I don't have the guts to attend it because the viewing areas are densely crowded. | NO IMAGE | NOT ATTENDED | POSITIVE |
| 5 | 501 | I'm excited about the fireworks! |  | UNKNOWN | POSITIVE |

FIG. 8

POSITIVE

108b₁ — ATTENDED FIREWORKS DISPLAY (108c₁)
- I have just now watched the Nagara River Fireworks Display! s as I thought, the finale was fantastic w.
- I have watched the fireworks at the Nagara River for the first time. It was very moving! Also, fireworks at a river are easy to watch (^0^)
- The fireworks at the Nagara River were beautiful. That was a night when I felt Japanese summer, Gifu summer. Fireworks looked like small Kompeito were beautiful.
- The Nagara River Fireworks Display was the best fireworks display I have ever watched. It was held in such a large place. It was pretty new for me because I had have watched a firework display only in a small place in an urban area.

108b₂ — NOT ATTENDED FIREWORKS DISPLAY
- @prestige888 The scale of the fireworks was so large, and also the viewing areas were so crowded. The people living in Tondabayashi city are lucky because they can watch such fantastic fireworks every year. I want to attend it someday. But, when I think about long lines & very heavy congestion on the way home ··· (^_^;), it seems difficult to attend it with kids.
- I really want to watch the fireworks at the Nagara River. But I don't have the guts to attend it because the viewing areas are densely crowded.
- I want to attend the fireworks display, but it seems difficult for me because I'm afraid of sounds.
- The fireworks display is great! I want to attend it! Actually, I don't like loud sounds!

NEGATIVE

108b₃ — ATTENDED FIREWORKS DISPLAY (108c₃)
- The fireworks at the Nagara River were beautiful. But the viewing areas were crowded ··· to death ··· well, to death!!
- The fireworks were beautiful ♡! I don't like congestion. So I left earlier, but the congestion was terrible. It was hard to believe that I moved only 10 meters in one hour. That was hard.
- @ayumi_theone I'm attending the Nagara River Fireworks Display. I left my car on the way home, but that was very hard (^^;)
- @marcho01 Many thanks for your trouble. I don't think I completely enjoyed it. I'm wondering which direction they faced because, maybe, they were set off in a slanting direction from the sponsor side. But the fireworks themselves were excellent!

108b₄ — NOT ATTENDED FIREWORKS DISPLAY
- The smells around the stations near the festival and the fireworks display are very unpleasant. Because they are very bad, I think a terror attack has occurred.
- @kinsan_k Trash left after the fireworks display is a serious issue. I don't think I will attend it w
- I was thinking the fireworks display is noise pollution, isn't it? Also because it's raining, cancel it, cancel it! Cancel ··· damn it!!
- For the fireworks display, because of people who take places like crazy, the streets become like slums. So I don't like it.
- The fireworks display is noisy and a crowd of people gather.

108a

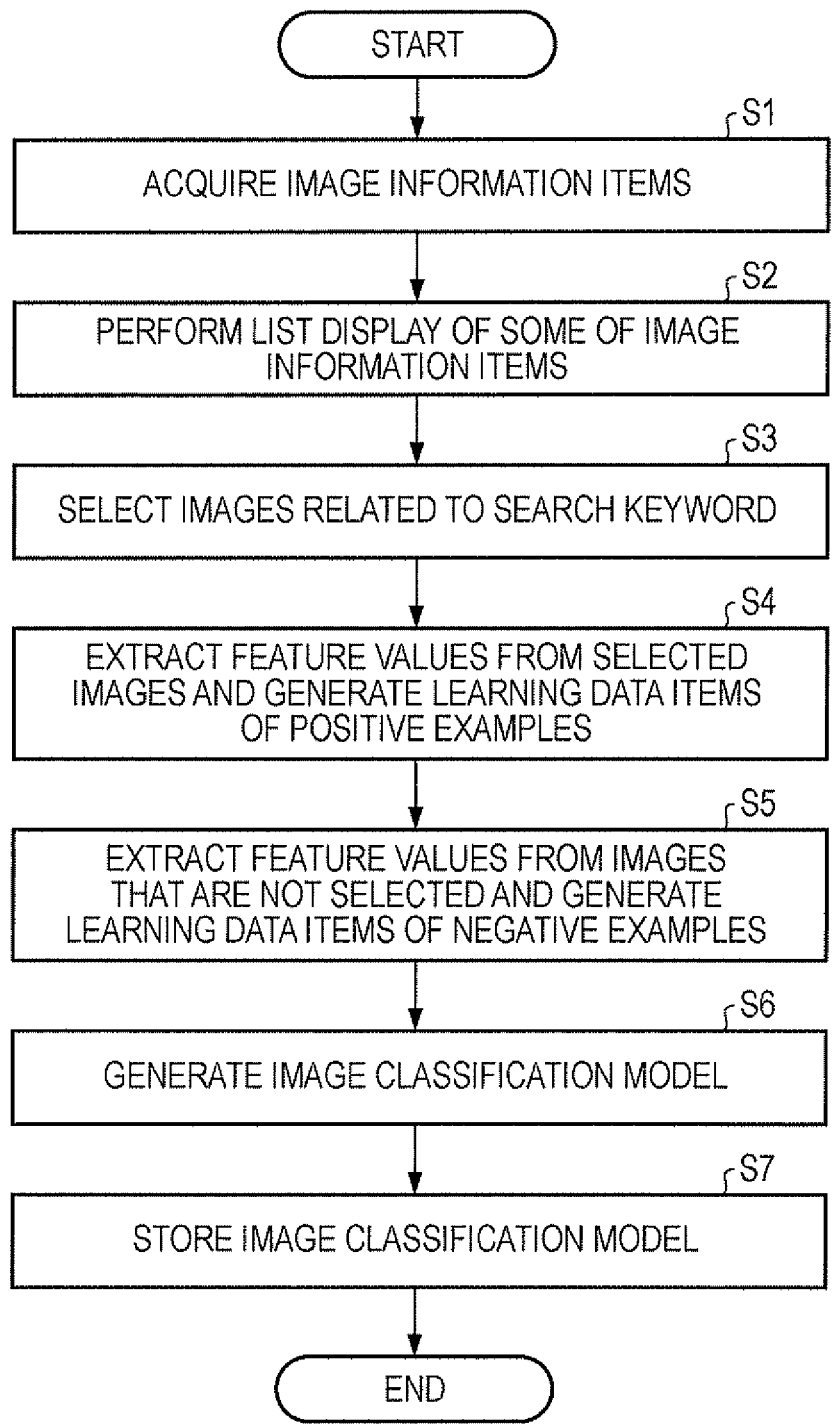

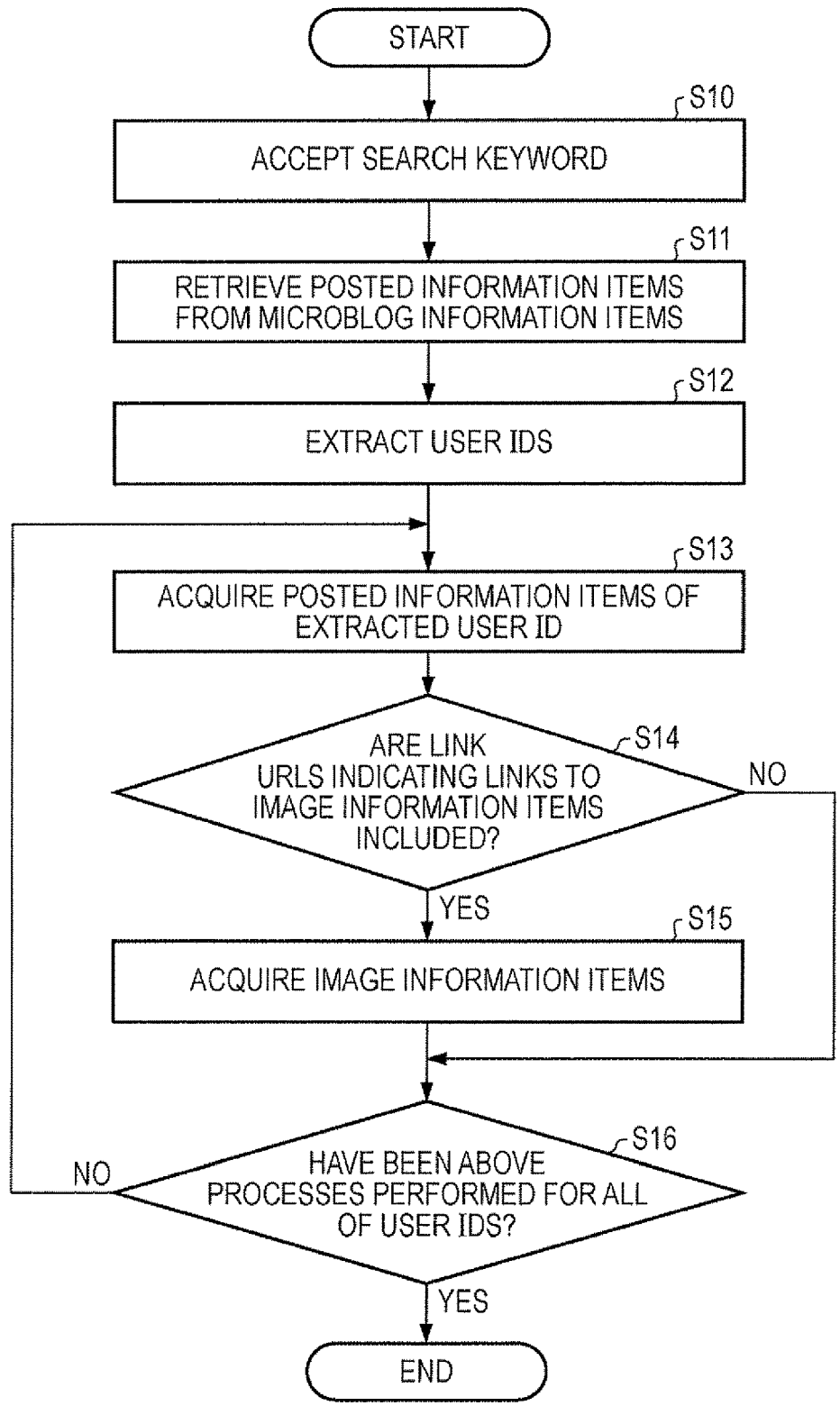

NON-TRANSITORY COMPUTER-READABLE MEDIUM, INFORMATION CLASSIFICATION METHOD, AND INFORMATION PROCESSING APPARATUS

CROSS-REFERENCE TO RELATED APPLICATIONS

This application is based on and claims priority under 35 USC 119 from Japanese Patent Application No. 2012-196417 filed Sep. 6, 2012.

BACKGROUND

Technical Field

The present invention relates to a non-transitory computer-readable medium, an information classification method, and an information processing apparatus.

SUMMARY

According to an aspect of the invention, there is provided a non-transitory computer-readable medium storing a program causing a computer to execute a process. The process includes the following: accepting a search keyword; retrieving, from multiple information items posted by multiple users, a posted information item including the accepted search keyword, each of the multiple posted information items including at least either of a text information item and an image information item, and acquiring posted information items which are within a predetermined chronological range with respect to the posted information item including the search keyword; and classifying, as image information items related to the search keyword, some of image information items included in the posted information items that have been acquired, and performing first determination of, for each of the classified image information items, whether or not a user who posted an information item including the classified image information item took an action related to the search keyword.

BRIEF DESCRIPTION OF THE DRAWINGS

Exemplary embodiments of the present invention will be described in detail based on the following figures, wherein:

FIG. 3 is a schematic diagram illustrating an example of a configuration of microblog information items;

FIG. 4 is a schematic diagram illustrating an example of a configuration of microblog image information items;

FIG. 5 is a schematic diagram illustrating an example of a configuration of microblog text information items;

FIG. 6 is a schematic diagram illustrating an example of a configuration of an image list display screen that is displayed on a display of a terminal by an image list display unit;

FIG. 7 is a schematic diagram illustrating an example of a configuration of classification-result information items;

FIG. 8 is a schematic diagram illustrating an example of a configuration of a display screen that is output by a classification-result output unit on the basis of the classification-result information items;

FIG. 9 is a flowchart illustrating an example of an operation of the microblog classification server in the case of generating an image classification model;

FIG. 10 is a flowchart illustrating an example of an operation of the microblog classification server in the case of acquiring the microblog information items;

DETAILED DESCRIPTION

Exemplary Embodiment

Configuration of Microblog Classification System

Figure 1:
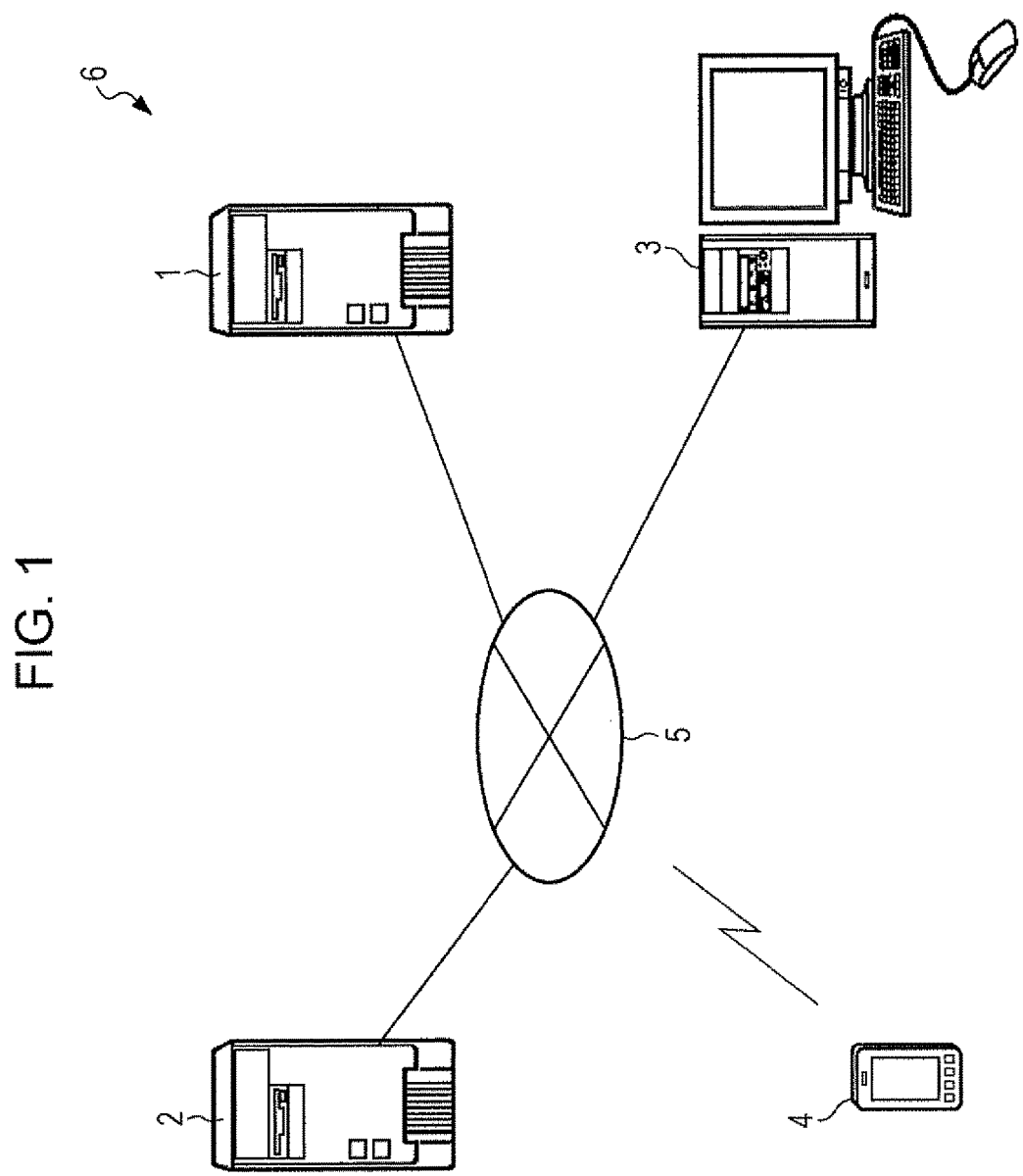
FIG. 1 is a block diagram illustrating an example of a configuration of a microblog classification system according to an exemplary embodiment of the present invention.

FIG. 1 is a schematic diagram illustrating an example of a configuration of a microblog classification system according to an exemplary embodiment of the present invention.

A microblog classification system 6 includes a microblog classification server 1, a microblog server 2, a terminal 3, and a terminal 4, and connects, using a network 5, the individual apparatuses so that the apparatuses are able to communicate with each other. Here, a microblog is a medium in which multiple text information items and image information items that were posted (transmitted) are mixed and displayed in chronological order. More specifically, microblog information items stored in the microblog server 2 are subjected to a display process by an information processing apparatus such as the terminal 3 or 4, whereby the microblog is displayed. Hereinafter, the unit of an information item posted on the microblog is referred, for simplicity, to as a "posted information item". It is supposed that a posted information item includes a text information item and an image information item, includes only a text information item, or includes only an image information item. In other words, each of the microblog information items includes multiple posted information items. Furthermore, posted information items are information items posted by multiple users.

The microblog classification server 1 is an information processing apparatus that includes electronic components such as a central processing unit (CPU) having functions for processing information items and a memory. The microblog classification server 1 accepts a search keyword, acquires posted information items related to the search keyword from the microblog server 2, and classifies the acquired posted information items. Each of the acquired posted information items is classified by determining whether or not a user who posted the information item that has been acquired as a posted information item took an action related to the search keyword, and by determining whether the content of the posted information item that has been acquired is positive (favorable) or negative (unfavorable).

The microblog server 2 is an information processing apparatus that includes electronic components such as a CPU having functions for processing information items and a memory. The microblog server 2 accepts text information items such text items and/or image information items concerning still images such as photographs or moving images, which have been transmitted from the terminal 4 or the like and which are to be referred to as posted information items, and generates microblog information items for displaying the posted information items in chronological order. Moreover, when the microblog server 2 accepts, from the terminal 4, a request to view the microblog information items, the microblog server 2 transmits the microblog information items to the terminal 4. Note that it is supposed that an image information item included in a posted information item directly includes an information item concerning a still image or a moving image or includes a link destination information item concerning a link destination in which an information item concerning a still image or a moving image is stored. Furthermore, a text information item included in a posted information item may directly include an information item concerning a text item or may include a link destination information item concerning a link destination in which an information item concerning a text file, a hypertext markup language (HTML) file, or the like is stored.

The terminal 3 includes an operation unit such as a keyboard or mouse used to input an instruction for an operation, a display such as a liquid crystal display, a controller such as a CPU having functions for processing information items, and a memory such as a hard disk drive (HDD). The terminal 3 accepts a search keyword input from a user, transmits the search keyword to the microblog classification server 1, and requests the microblog classification server 1 to perform classification of the microblog information items. When classification results are output from the microblog classification server 1, the terminal 3 receives the classification results, and displays the classification results on the display.

Note that the terminal 3 is, for example, a personal computer. Alternatively, a mobile phone, a personal digital assistant (PDA), or the like may be used as the terminal 3. Furthermore, although one terminal 3 is illustrated in FIG. 1, the number of terminals 3 may be two or more.

The terminal 4 includes an operation unit such as a touch panel used to input an instruction for an operation, a display such as a liquid crystal display provided under the touch panel, and a controller having electronic components such as a CPU and a memory. The terminal 4 transmits an information item, which is to be referred to as a posted information item, such as a text item or an image, to the microblog server 2 in accordance with an operation performed by a user, thereby posting the information item on the microblog. Moreover, the terminal 4 transmits, to the microblog server 2, in accordance with an operation performed by the user, a request to view the microblog. When the terminal 4 receives the microblog information items from the microblog server 2 as a result of the request to view the microblog, the terminal 4 displays, on the display, text items or images (still images or moving images) included in posted information items of the microblog.

Note that the terminal 4 is, for example, a mobile phone. Alternatively, a PDA, a personal computer, or the like may be used as the terminal 4. Furthermore, although one terminal 4 is illustrated in FIG. 1, the number of terminals 4 may be two or more.

The network 5 is a communication network such as the Internet or a local area network (LAN), regardless of whether the network 5 is a wired network or wireless network.

Configuration of Microblog Classification Server

Figure 2:
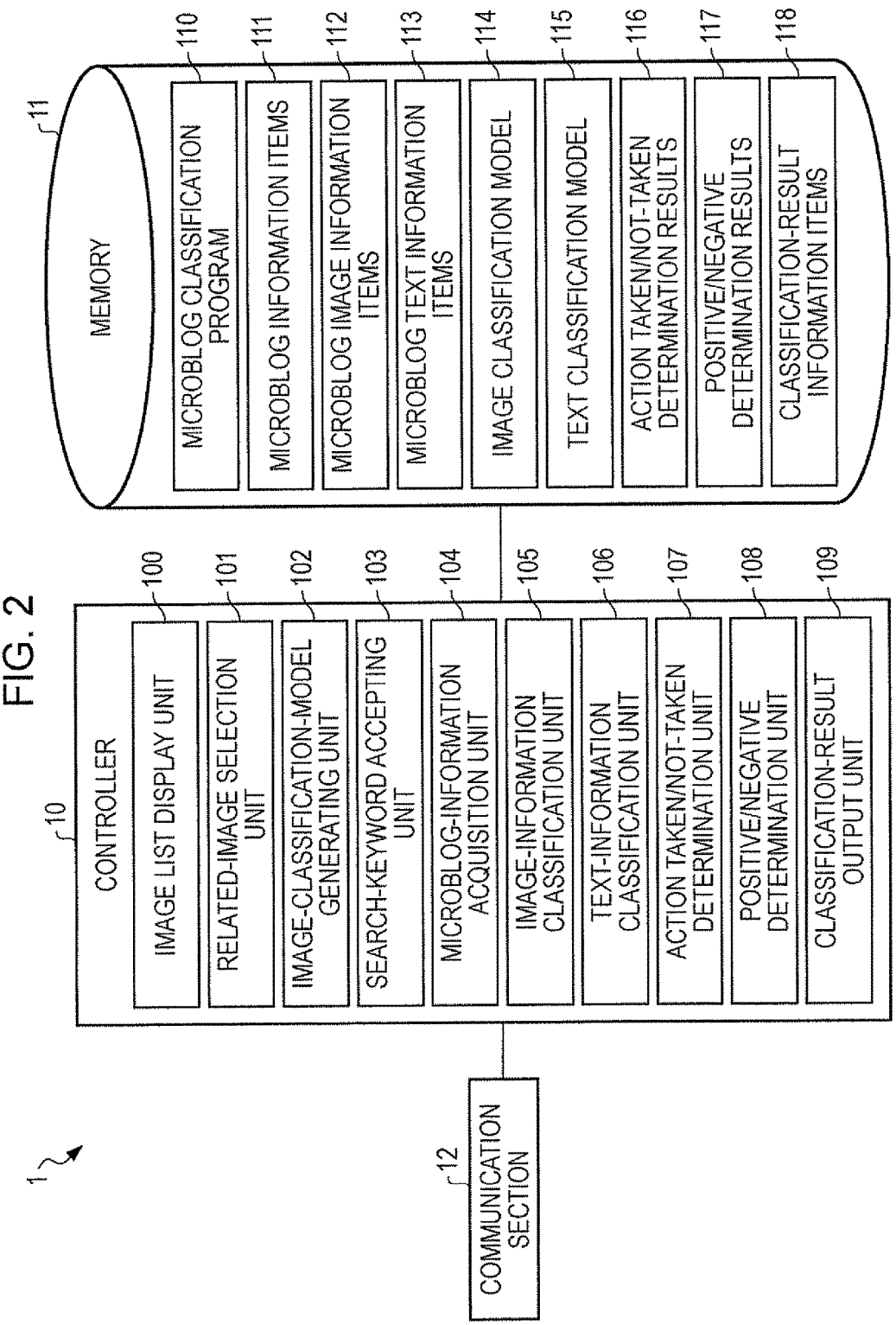
FIG. 2 is a block diagram illustrating an example of a configuration of a microblog classification server.

FIG. 2 is a block diagram illustrating an example of a configuration of the microblog classification server 1.

The microblog classification server 1 includes a controller 10, a memory 11, and a communication section 12. The controller 10 is constituted by a CPU or the like, and controls individual units and executes various types of programs. The memory 11 is provided as an example of a storage device that is constituted by a recording medium such as an HDD or a flash memory and that stores information items. The communication section 12 communicates with an external apparatus via the network 5.

The controller 10 executes a microblog classification program 110, which is described below, thereby functioning as an image list display unit 100, a related-image selection unit 101, an image-classification-model generating unit 102, a search-keyword accepting unit 103, a microblog-information acquisition unit 104, an image-information classification unit 105, a text-information classification unit 106, an action taken/not-taken determination unit 107, a positive/negative determination unit 108, a classification-result output unit 109, and so forth.

The image list display unit 100 generates, for all or a predetermined number of microblog information items that have been acquired by the microblog-information acquisition unit 104 described below, an information item for performing list display of image information items included in the microblog information items on the display of the terminal 3, and transmits the generated information item to the terminal 3.

In a state in which the information item generated by the image list display unit 100 is displayed on the display of the terminal 3, the related-image selection unit 101 selects, in accordance with an operation performed by the user of the terminal 3, some images from the images that are being displayed.

The image-classification-model generating unit 102 extracts, as learning data items of positive examples, feature values from the images selected by the related-image selection unit 101. The image-classification-model generating unit 102 extracts, as learning data items of negative examples, feature values from images that are not selected by the related-image selection unit 101. The image-classification-model generating unit 102 generates, using the learning data items, an image classification model 114 in relation to a search keyword accepted by the search-keyword accepting unit 103. Note that a generating method will be described below.

The search-keyword accepting unit 103 accepts a search keyword from the terminal 3.

The microblog-information acquisition unit 104 acquires, from the microblog server 2, microblog information items 111 related to the search keyword accepted by the search-keyword accepting unit 103, and stores the microblog information items 111 in the memory 11. Note that the microblog information items 111 may be acquired from all of the microblog information items accumulated in the microblog server 2, or may be acquired from microblog information items that have been obtained by filtering using a predetermined time period, a predetermined keyword, or the like. A method for acquiring the microblog information items 111 will be described below.

The image-information classification unit 105 stores information items that have been obtained by removing text information items from individual posted information items included in the microblog information items 111 acquired by the microblog-information acquisition unit 104, i.e., only image information items, as microblog image information items 112 in the memory 11.

The text-information classification unit 106 stores information items that have been obtained by removing image information items from the individual posted information items included in the microblog information items 111 acquired by the microblog-information acquisition unit 104, i.e., text information items, as microblog text information items 113 in the memory 11.

The action taken/not-taken determination unit 107 determines, on the basis of the image classification model 114, for each of the microblog image information items 112, whether or not a user who posted an information item including the microblog image information item 112 took an action related to the search keyword accepted by the search-keyword accepting unit 103, and stores an action taken/not-taken determination result 116 in the memory 11. Note that, when the microblog image information item 112 matches the image classification model 114, the action taken/not-taken determination unit 107 determines that the user took the action. Furthermore, for each of the microblog text information items 113, when the microblog text information item 113 does not match a text classification model 115 that is prepared, the action taken/not-taken determination unit 107 determines that the user did not take the action. Specific determination methods will be described below. Additionally, a second text classification model may be provided, and, for each of the microblog text information items 113, when the microblog text information item 113 matches the second text classification model, the action taken/not-taken determination unit 107 may determine that the user took the action.

The positive/negative determination unit 108 determines, on the text classification model 115, for each of the microblog text information items 113, whether the content of a posted information item including the microblog text information item 113 is positive (favorable) or negative (unfavorable), and stores a positive/negative determination result 117 in the memory 11. Note that, the text classification model 115 used by the positive/negative determination unit 108 is learned from feature vectors, for example, each of which represents the presence/absence of individual words as an element in text items that each belong to a positive group or a negative group. The positive/negative determination unit 108 generates a feature vector similarly for a text information item that is a classification target, and compares the generated feature vector with the feature vectors obtained as a result of learning. Accordingly, the text information item that is a classification target is classified by determining whether the text information item belongs to the positive group or the negative group. Furthermore, the positive/negative determination unit 108 may determine, on the basis of each of the microblog image information items 112, whether the content of a posted information item including the microblog image information item 112 is positive or negative.

The classification-result output unit 109 generates classification-result information items 118 from the action taken/not-taken determination results 116 and the positive/negative determination results 117, and outputs the classification-result information items 118 to an external apparatus, e.g., the terminal 3.

The memory 11 stores the microblog classification program 110, the microblog information items 111, the microblog image information items 112, the microblog text information items 113, the image classification model 114, the text classification model 115, the action taken/not-taken determination results 116, the positive/negative determination results 117, the classification-result information items 118, and so forth.

The microblog classification program 110 is a program that causes the controller 10 to operate as the above-described individual units 100 to 108.

It is supposed that the image classification model 114 has, as different information items, information items used by the action taken/not-taken determination unit 107 and information items used by the positive/negative determination unit 108. Furthermore, it is supposed that, similarly, the text classification model 115 also has, as different information items, information items used by the action taken/not-taken determination unit 107 and information items used by the positive/negative determination unit 108. Note that the image classification model 114 is not limited to an image classification model generated by the image-classification-model generating unit 102. A model prepared in the memory 11 may be used as the image classification model 114, or a configuration in which a model prepared in an external unit is acquired as the image classification model 114 may be used.

FIG. 3 is a schematic diagram illustrating an example of a configuration of the microblog information items 111.

The microblog information items 111 have a user ID column, a microblog ID column, and a content column. In the user ID column, identifiers of users who posted information items that are referred to as posted information items are arranged. In the microblog ID column, for example, identifiers that are added in chronological order are arranged. In the content column, content items that are text items input as the posted information items, URLs of other servers in which images (still images or moving images) are stored and which are not illustrated, or the text items and the URLs are arranged. Note that, instated of the URLs arranged in the content column, information items concerning the still images or the moving images may be directly arranged in the content column.

Note that, although each of the content items includes a time information item indicating a time at which the content item was posted, here, the time information item is omitted and the content item is displayed.

FIG. 4 is a schematic diagram illustrating an example of a configuration of the microblog image information items 112.

The microblog image information items 112 have a user ID column, a microblog ID column, and an image content column. The user ID column and the microblog ID column are same as the user ID column and the microblog ID column illustrated in FIG. 3. In the image content column, actual image information items stored in URLs which were input as posted information items are arranged.

In other words, the microblog image information items 112 are obtained by removing, from the microblog information items 111, posted information items including only text items, and by acquiring image information items from URLs in which images are stored.

FIG. 5 is a schematic diagram illustrating an example of a configuration of the microblog text information items 113.

The microblog text information items 113 have a user ID column, a microblog ID column, and a text content column. The user ID column and the microblog ID column are the same as user ID column and the microblog ID column illustrated in FIG. 3. In the text content column, content items that are text items which were input as posted information items are arranged.

In other words, the microblog text information items 113 are obtained by removing, from the microblog information items 111, posted information items including only URLs in which images are stored, and by removing URLs from the remaining posted information items.

Operation of Microblog Classification System

Next operations in the present exemplary embodiment are separately described as the following operations: (1) basic operation; (2) image-classification-model generating operation; (3) microblog-information acquiring operation; (4) action taken/not-taken determination operation; (5) positive/negative determination operation; and (6) classification-result output operation.

(1) Basic Operation

First, the user of the terminal 4 performs, on the terminal 4, an operation for transmitting an information item, which is to be referred to as a posted information item, to the microblog. Note that the following operation may be performed on the terminal 3.

The terminal 4 transmits, to the microblog server 2, in accordance with the operation performed by the user, an information item which includes a text item, an image, or the like and which is to be referred to as a posted information item, thereby posting the information item on the microblog.

The microblog server 2 receives the posted information item from the terminal 4, thereby accumulating the microblog information items.

Furthermore, the user of the terminal 4 performs, on the terminal 4, an operation for viewing the microblog.

The terminal 4 transmits, to the microblog server 2, in accordance with the operation performed by the user, a request to view the microblog information items.

The microblog server 2 transmits the microblog information items to the terminal 4.

When the terminal 4 receives the microblog information items from the microblog server 2, the terminal 4 displays, on the display, text items or images posted on the microblog.

Next, an operation for generating an image classification model will be described as an operation that is preparatory to classification of the microblog information items.

(2) Image-Classification-Model Generating Operation

FIG. 9 is a flowchart illustrating an example of an operation of the microblog classification server 1 in the case of generating the image classification model 114.

First, the image list display unit 100 acquires, among the microblog information items acquired by the microblog-information acquisition unit 104, all of the microblog information items or a predetermined number of microblog information items (S1). The image list display unit 100 generates an information item for performing list display of image information items included in the microblog information items on the display of the terminal 3, and transmits the generated information item to the terminal 3 (S2).

The terminal 3 receives the information item, and displays an image list display screen on the display.

FIG. 6 is a schematic diagram illustrating an example of a configuration of an image list display screen that is displayed on the display of the terminal 3 by the image list display unit 100.

In an image list display screen 103*a*, list display of multiple images 112$_1$, 112$_2$, . . . is performed. Note that the image list display screen 103*a* may be displayed in multiple pages.

Next, the user operates the operation unit of the terminal 3 with reference to the image list display screen 103*a*, thereby selecting certain images. The details of the operation are transmitted from the terminal 3 to the microblog classification server 1. Here, for example, it is supposed that the user selects images related to a keyword of "ABC fireworks display", i.e., images including fireworks, images including shop stands, images including people wearing yukatas that are Japanese garments, and so forth.

Next, the related-image selection unit 101 of the microblog classification server 1 accepts the details of the operation. In a state in which the information item generated by the image list display unit 100 is displayed on the display of the terminal 3, the related-image selection unit 101 selects, in accordance with the operation performed by the user of the terminal 3, some images from the images that are being displayed (S3). The selected images are in a state of being selected using a selection frame 103*b* as illustrated in FIG. 6.

Next, the image-classification-model generating unit 102 extracts feature values of the images selected by the related-image selection unit 101, and generates learning data items of the positive examples (S4).

Next, the image-classification-model generating unit 102 extracts feature values of the images that are not selected by the related-image selection unit 101, and generates learning data items of the negative examples (S5). Note that classification of the images is not limited to classification into two groups that are the positive example and the negative example, and may be classification into multiple groups.

Next, the image-classification-model generating unit 102 generates the image classification model 114 from the learning data items of the positive examples and the learning data items of the negative examples in relation to the search keyword ("ABC fireworks display") accepted by the search-keyword accepting unit 103 described below (S6), and stores the image classification model 114 in the memory 11 (S7).

Meanwhile, in order to make a request of the microblog classification server 1 to classify the microblog information items, the user of the terminal 3 operates the operation unit of the terminal 3, thereby inputting a search keyword. The terminal 3 transmits, together with the request to classify the microblog information items, the search keyword to the microblog classification server 1.

The microblog classification server 1 operates as follows in response to the request.

(3) Microblog-Information Acquiring Operation

FIG. 10 is a flowchart illustrating an example of an operation of the microblog classification server 1 in the case of acquiring the microblog information items.

First, the search-keyword accepting unit 103 accepts the search keyword of "ABC fireworks display" from the terminal 3 (S10).

Next, the microblog-information acquisition unit 104 retrieves posted information items on the basis of the search keyword accepted by the search-keyword accepting unit 103 from the microblog information items stored in the microblog server 2 (S11). Note that, in the case of retrieving posted information items, posted information items completely including "ABC fireworks display" may be retrieved. In addition, an abbreviation of the search keyword or multilingual versions of the keyword may be used, or posted information items may be retrieved using multiple keywords.

Next, the microblog-information acquisition unit 104 extracts user IDs of the posted information items which include the search keyword and which have been retrieved as search results (S12), and acquires, for each of the extracted user IDs, posted information items that were posted by the user ID (S13). Note that all posted information items that were posted by the user ID may be acquired, or, for each of the posted information items including the search keyword, posted information items that are within a predetermined chronological range with respect to the posted information item including the search keyword may be acquired.

Next, when link URLs indicating links to image information items are included in the posted information items that have been acquired, the microblog-information acquisition unit 104 acquires the image information items stored in the link URLs (S15).

Steps S13 to S15 described above are performed for all of the user IDs extracted in step S12.

Next, the microblog classification server 1 operates as follows so as to determine whether or not an action related to the search keyword was taken.

(4) Action Taken/not-Taken Determination Operation

Figure 11:
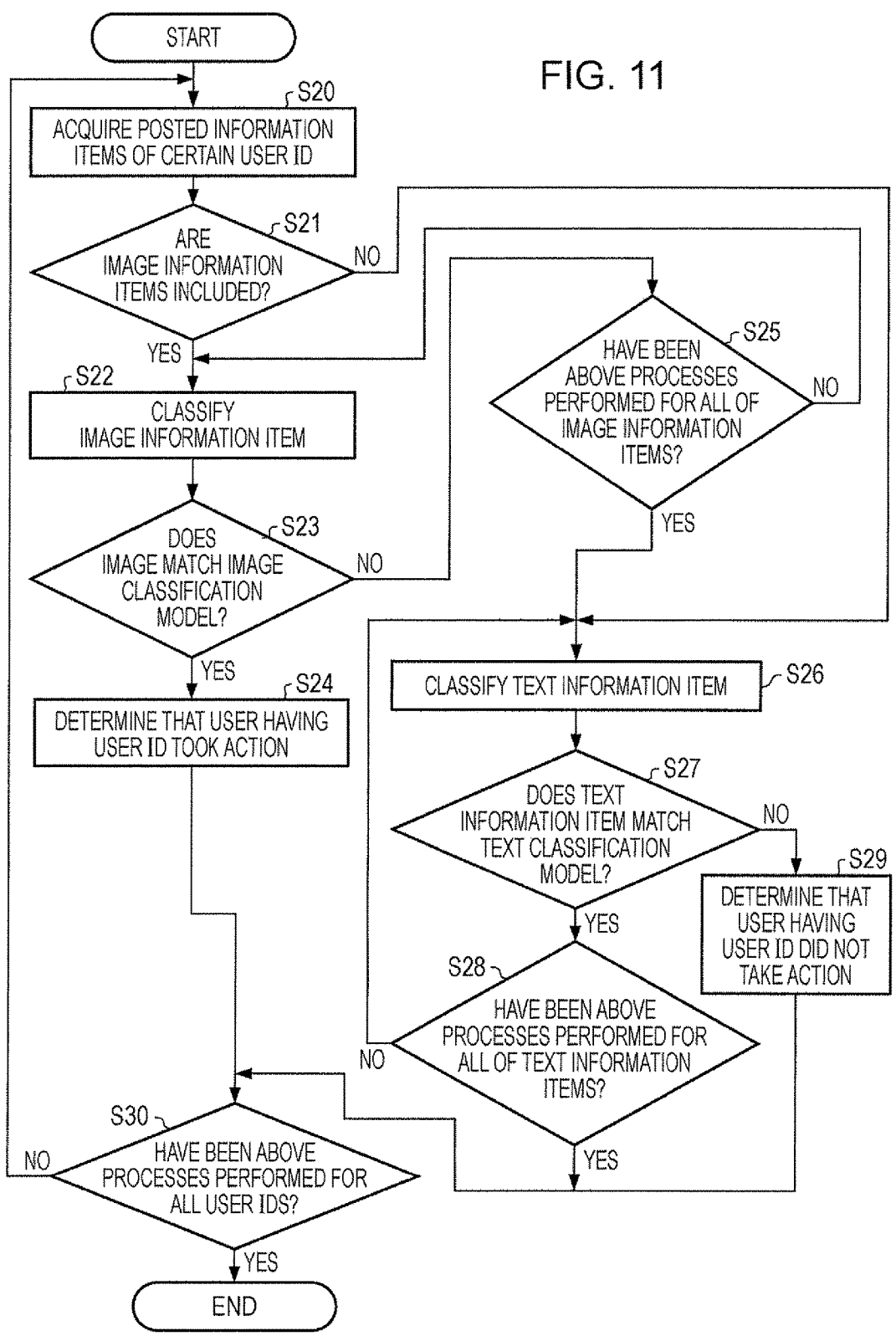
FIG. 11 is a flowchart illustrating an example of an operation of the microblog classification server in the case of determining whether or not a user who posted an information item, which is referred to as a posted information item, took an action.

FIG. 11 is a flowchart illustrating an example of an operation of the microblog classification server 1 in the case of determining whether or not a user who posted information items that are referred to as posted information items took an action.

First, the action taken/not-taken determination unit 107 acquires posted information items of a certain user ID (S20).

Next, the image-information classification unit 105 considers only image information items of the certain user ID as the microblog image information items 112 (S22). The action taken/not-taken determination unit 107 determines whether or not each of images included in the microblog image information items 112 matches the positive example of the image classification model 114 (S23 and S24). In other words, the action taken/not-taken determination unit 107 classifies some of the microblog image information items 112 as image information items related to the search keyword. As a result of classification, for each of the classified microblog image information items 112, when the classified microblog image information item 112 matches the positive example (YES in S23), the action taken/not-taken determination unit 107 determines that the user having the user ID "took the action" related to the search keyword (S24). Note that, in the case where the search keyword is "ABC fireworks display", the phrase "took the action" indicates, for example, that a user "attended to the ABC fireworks display". Here, it is supposed that "classification as image information items related to the search keyword" includes not only classification as image information items which match the image classification model 114 generated in "(2) image-classification-model generating operation", but also classification as image information items which match a model prepared in the memory 11 or a model prepared in an external unit.

Note that, in step S24, in the case where, for the same user ID, the number of images that match the positive example is equal to or larger than a predetermined threshold, the action taken/not-taken determination unit 107 may determine that the user having the user ID "took the action".

Next, when, in step S23, the classified microblog image information item 112 does not match the positive example (NO in S23), whether or not the user having the user ID took the action is still "unknown". Accordingly, next, classification based on text information items is performed. The text-information classification unit 106 considers, as the microblog text information items 113, only text information items included in the posted information items, which have been acquired by the action taken/not-taken determination unit 107, of the certain user ID (S26). The action taken/not-taken determination unit 107 determines whether or not each of the microblog text information items 113 matches the text classification model 115 (S27 and S28). When the microblog text information item 113 does not match the text classification model 115 (NO in S27), the action taken/not-taken determination unit 107 determines that the user having the user ID did "not take the action" (S29). Note that, in the case where the search keyword is "ABC fireworks display", the phrase "not take the action" indicates, for example, that a user did "not attend to the ABC fireworks display".

Note that determination of whether or not the action was taken, which is described above, is performed for all user IDs (S30), and determination results are stored as the action taken/not-taken determination results 116 in the memory 11.

Next, the microblog classification server 1 operates as follows so as to determine whether the content of a posted information item is positive or negative.

(5) Positive/Negative Determination Operation

Figure 12:
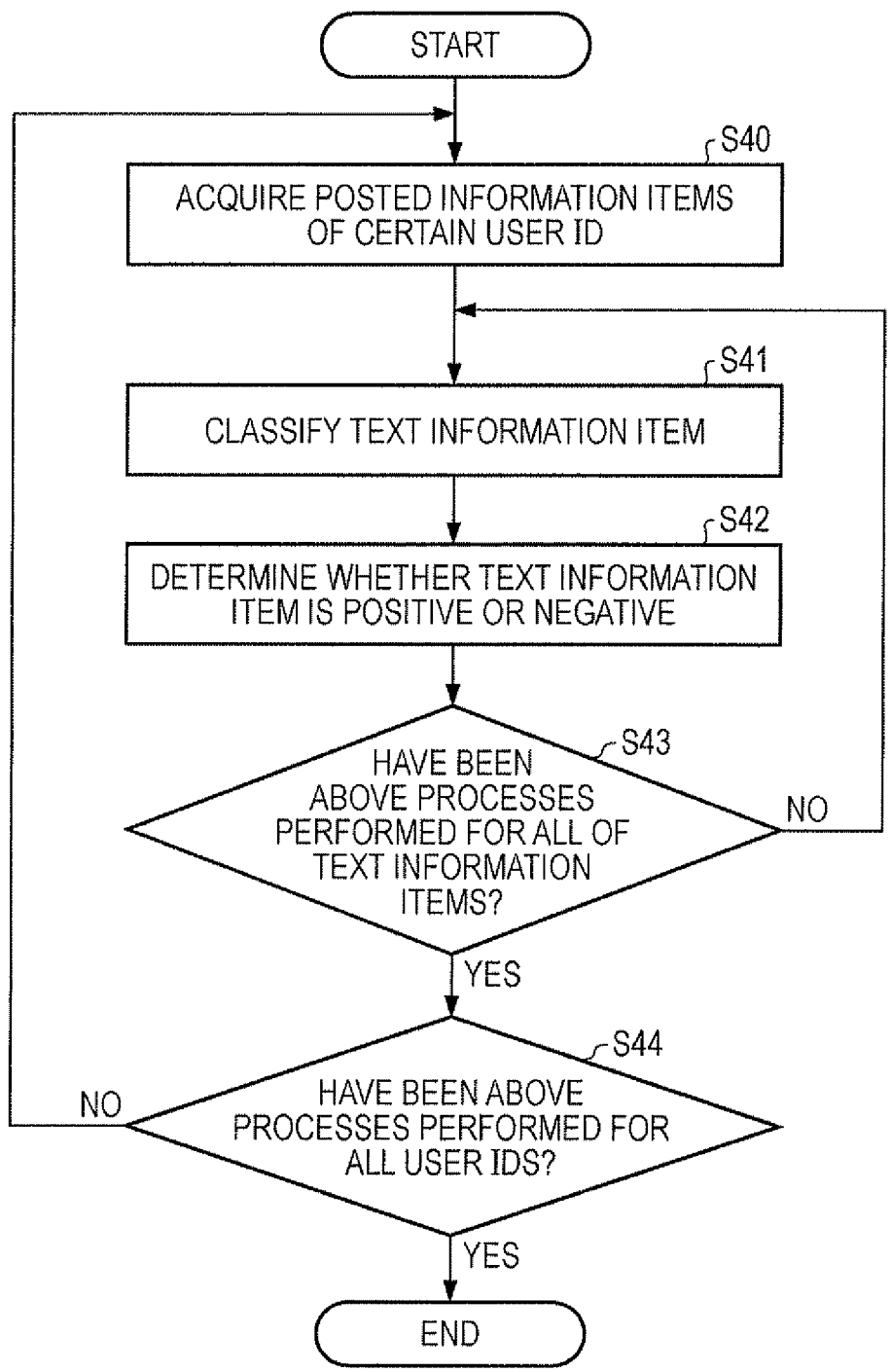
FIG. 12 is a flowchart illustrating an example of an operation of the microblog classification server in the case of determining whether the content of a posted information item is positive or negative.

FIG. 12 is a flowchart illustrating an example of an operation of the microblog classification server 1 in the case of determining whether the content of a posted information item is positive or negative.

First, the positive/negative determination unit 108 acquires posted information items of a certain user ID (S40).

The text-information classification unit 106 considers, as the microblog text information items 113, only text information items included in the posted information items, which have been acquired by the positive/negative determination unit 108, of the certain user ID (S41). The positive/negative determination unit 108 determines whether the content of each of the microblog text information items 113 is positive or negative (S42 and S43). Note that, in the case where the search keyword is "ABC fireworks display", the term "positive" indicates, for example, a favorable opinion about the "ABC fireworks display", and the term "negative" indicates, for example, an unfavorable opinion about the "ABC fireworks display".

Note that determination of whether or not the content of a text information item is positive or negative, which is described above, is performed for all user IDS (S44), and determination results are stored as the positive/negative determination results 117 in the memory 11.

(6) Classification-Result Output Operation

Next, the classification-result output unit 109 generates the classification-result information items 118 from the action taken/not-taken determination results 116 and the positive/negative determination results 117, and transmits the classification-result information items 118 to the terminal 3.

FIG. 7 is a schematic diagram illustrating an example of a configuration of the classification-result information items 118.

The classification-result information items 118 have a user ID column, a microblog ID column, a content column, an image content column, an action taken/not-taken determination result column, and a positive/negative determination result column. The user ID column, the microblog ID column, and the content column are the user ID column, the microblog ID column, and the content column illustrated in FIG. 3, which are provided as common columns. The image content column is the image content column illustrated in FIG. 5, which is provided as a common column. In the action taken/not-taken determination result column, the determination results obtained by the action taken/not-taken determination unit 107 are arranged. In the positive/negative determination result column, the determination results obtained by the positive/negative determination unit 108 are arranged.

Note that determination of whether or not an action was taken is performed for each user ID, and determination of whether the content of a text information item is positive or negative is performed for each posted information item.

Furthermore, the terminal 3 may receive the classification-result information items 118, and may display the following information items on the display.

FIG. 8 is a schematic diagram illustrating an example of a configuration of a display screen that is output by the classification-result output unit 109 on the basis of the classification-result information items 118.

A classification-result-information display screen 108a includes content items 108b$_1$ and an image 108c$_1$, content items 108b$_2$, content items 108b$_3$ and an image 108c$_3$, and content items 108b$_4$. The content items 108b$_1$ and the image 108c$_1$ are posted information items, and each of the posted information items indicates, for the action, that a user "attended the fireworks display" and the content of the posted information item is "positive". The content items 108b$_2$ are posted information items, and each of the posted information items indicates, for the action, that a user did "not attend the fireworks display" and the content of the posted information item is "positive". The content items 108b$_3$ and the image 108c$_3$ are posted information items, and each of the posted information items indicates, for the action, that a user "attended the fireworks display" and the content of the posted information item is "negative". The content items 108b$_4$ are posted information items, and each of the posted information item indicates, for the action, that a user did "not attend the fireworks display" and the content of the posted information item is "negative".

In the foregoing exemplary embodiment, each of the microblog image information items 112 is classified on the basis of the image classification model 114, and whether or not a user who posted an information item including the classified image information item took an action related to a search keyword is determined. Additionally, each of the microblog text information items 113 is classified on the basis of the text classification model 115, and whether or not a user who posted an information item including the classified text information item took the action related to the search keyword is determined. Accordingly, a posted information item may be classified by determining whether or not a user who posted the information item took the action.

Furthermore, each of the microblog text information items 113 included in posted information items is classified on the basis of the text classification model 115, and whether the content of a posted information item including the classified text information item is favorable or unfavorable is determined. Accordingly, a posted information item may be classified by determining whether the content of the posted information item is positive or negative.

Moreover, classification results are displayed as in the classification-result-information display screen 108a illustrated in FIG. 8. Accordingly, for example, the attractive points of the "ABC fireworks display" may be extracted from the content items 108b$_1$ and the image 108c$_1$. For example, points for causing users to attend the "ABC fireworks display" may be extracted from the content items 108b$_1$ and the image 108c$_1$, and the content items 108b$_2$. Improvement points of the "ABC fireworks display" may be extracted from the content items 108b$_3$ and the image 108c$_3$. Points for improving the impression of the "ABC fireworks display" may be extracted from the content items 108b$_4$. Furthermore, a statistical information item concerning the classification-result information items 118 illustrated in FIG. 7 may be generated and output. Moreover, distribution of information items to individual users on the basis of the classification-result information items 118 may be performed. More specifically, for example, advertisements are distributed to users who attended the "ABC fireworks display" and users who did not attend the "ABC fireworks display" in such a manner that the content of the advertisement distributed to the users who attended the "ABC fireworks display" and the content of the advertisement distributed to the users who did not attend the "ABC fireworks display" are different from each other.

Other Exemplary Embodiments

Note that the present invention is not limited to the foregoing exemplary embodiment, and various modifications may be made without departing from the scope of the present invention. For example, the microblog is not limited to Twitter (registered trademark), and any type of medium may be used if the medium is a medium on which comparatively short text items are posted, in which text information items and image information items (including still images, moving images, and link destination information items concerning links to information items concerning the still images or moving images) are mixed, and in which a large number of text information items and image information items are displayed in chronological order, such as Facebook (registered trademark). Furthermore, messages or the like of mail may be targets to be processed.

In the foregoing exemplary embodiment, the functions of the individual units 100 to 108 included in the controller 10 are realized by a program. However, all or some of the individual units may be realized by hardware such as an application-specific integrated circuit (ASIC). Furthermore, the program used in the foregoing exemplary embodiment may be stored on a recording medium, such as a compact disc read-only memory (CD-ROM), and supplied. Moreover, the steps described in the foregoing exemplary embodiment may be, for example, replaced, removed, or added without changing the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer-readable medium storing a program causing a computer to execute a process, the process comprising:

accepting a search keyword;

retrieving, from a plurality of information items posted by a plurality of users, a posted information item including the accepted search keyword, each of the plurality of posted information items including at least either of a text information item and an image information item, and acquiring posted information items which are within a predetermined chronological range with respect to the posted information item including the search keyword;

classifying, as image information items related to the search keyword, some of image information items included in the posted information items that have been acquired, and performing first determination of, for each of the classified image information items, whether or not a user who posted an information item including the classified image information item took an action related to the search keyword by comparing each of the classified image information items to an image classification model, where each first determination for one of the classified image information items makes the determination by examining a plurality of the classified image information items; and determining whether the image classification model matches the classified image information item, wherein if the image classification model matches the classified image information item, it is determined that the user took an action that includes posting the information item.

2. The medium according to claim 1, wherein, in the acquiring, a posted information item including the search keyword is retrieved from the plurality of posted information items, and, among other posted information items of a user who posted the information item including the search keyword, posted information items that are within a predetermined chronological range with respect to the posted information item including the search keyword are acquired.

3. The medium according to claim 1, wherein, in the classifying and performing first determination, text information items included in the posted information items that have been acquired are classified, and, for each of the classified text information items, whether or not a user who posted an information item including the classified text information item took the action related to the search keyword is determined.

4. The medium according to claim 2, wherein, in the classifying and performing first determination, text information items included in the posted information items that have been acquired are classified, and, for each of the classified text information items, whether or not a user who posted an information item including the classified text information item took the action related to the search keyword is determined.

5. The medium according to claim 1, the process further comprising classifying text information items included in the posted information items that have been acquired, and, performing second determination of, for each of the classified text information items, whether the content of a posted information item including the classified text information item is favorable or unfavorable.

6. The medium according to claim 2, the process further comprising classifying text information items included in the posted information items that have been acquired, and, performing second determination of, for each of the classified text information items, whether the content of a posted information item including the classified text information item is favorable or unfavorable.

7. The medium according to claim 3, the process further comprising classifying text information items included in the posted information items that have been acquired, and, performing second determination of, for each of the classified text information items, whether the content of a posted information item including the classified text information item is favorable or unfavorable.

8. The medium according to claim 4, the process further comprising classifying text information items included in the posted information items that have been acquired, and, performing second determination of, for each of the classified text information items, whether the content of a posted information item including the classified text information item is favorable or unfavorable.

9. The medium according to claim 5, wherein, in the classifying and performing second determination, image information items included in the posted information items that have been acquired are classified, and, for each of the classified image information items, whether the content of a posted information item including the classified image information item is favorable or unfavorable is determined.

10. The medium according to claim 6, wherein, in the classifying and performing second determination, image information items included in the posted information items that have been acquired are classified, and, for each of the classified image information items, whether the content of a posted information item including the classified image information item is favorable or unfavorable is determined.

11. The medium according to claim 7, wherein, in the classifying and performing second determination, image information items included in the posted information items that have been acquired are classified, and, for each of the classified image information items, whether the content of a posted information item including the classified image information item is favorable or unfavorable is determined.

12. The medium according to claim 8, wherein, in the classifying and performing second determination, image information items included in the posted information items that have been acquired are classified, and, for each of the classified image information items, whether the content of a posted information item including the classified image information item is favorable or unfavorable is determined.

13. An information classification method comprising:
accepting a search keyword;
retrieving, from a plurality of information items posted by a plurality of users, a posted information item including the accepted search keyword, each of the plurality of posted information items including at least either of a text information item and an image information item, and acquiring posted information items which are within a predetermined chronological range with respect to the posted information item including the search keyword;
classifying, as image information items related to the search keyword, some of image information items included in the posted information items that have been acquired, and performing first determination of, for each of the classified image information items, whether or not a user who posted an information item including the classified image information item took an action related to the search keyword by comparing each of the classified image information items to an image classification model, where each first determination for one of the classified image information items makes the determination by examining a plurality of the classified image information items; and
determining whether the image classification model matches the classified image information item, wherein if the image classification model matches the classified image information item, it is determined that the user took an action that includes posting the information item.

14. An information processing apparatus comprising:
a processor and a memory, the memory storing a processor executable program, the processor executable program being configured to:
accept a search keyword;
retrieve, from a plurality of information items posted by a plurality of users, a posted information item including the search keyword accepted by the accepting unit, each of the plurality of posted information items including at least either of a text information item and an image information item, and that acquires posted information items which are within a predetermined chronological range with respect to the posted information item including the search keyword;

classifies, as image information items related to the search keyword, some of image information items included in the posted information items acquired by the acquisition unit, and that performs first determination of, for each of the classified image information items, whether or not a user who posted an information item including the classified image information item took an action related to the search keyword by comparing each of the classified image information items to an image classification model, where each first determination for one of the classified image information items makes the determination by examining a plurality of the classified image information items; and determining whether the image classification model matches the classified image information item, wherein if the image classification model matches the classified image information item, it is determined that the user took an action that includes posting the information item.

* * * * *